United States Patent [19]

Wetherill et al.

[11] Patent Number: 5,186,086

[45] Date of Patent: Feb. 16, 1993

[54] FINISHED PARTS CATCHER FOR AN AUTOMATIC MACHINE

[75] Inventors: Todd N. Wetherill, Montour Falls; Harold E. Walburn; Terrence M. Sheehan, both of Elmira, all of N.Y.

[73] Assignee: Hardinge Brothers, Inc., Elmira, N.Y.

[21] Appl. No.: 700,455

[22] Filed: May 15, 1991

[51] Int. Cl.⁵ .............................................. B23B 15/00
[52] U.S. Cl. ...................................... 82/124; 414/222
[58] Field of Search ............................ 82/124–127, 82/102; 414/222, 749

[56] References Cited

U.S. PATENT DOCUMENTS

| | | | |
|---|---|---|---|
| 1,788,240 | 1/1931 | Karcevsk | 82/124 |
| 1,964,937 | 7/1934 | Dumser et al. | 82/125 |
| 2,331,719 | 10/1943 | Oeschger | 82/124 |
| 2,991,892 | 7/1961 | DeHaas | 414/736 |
| 3,815,453 | 6/1974 | Takano et al. | 82/124 |
| 3,889,559 | 6/1975 | Scholtes | 82/124 |
| 4,183,269 | 1/1980 | Molliex | 82/124 |
| 4,406,192 | 9/1983 | Wada | 82/19 |
| 4,463,634 | 8/1984 | Lee | 82/124 |
| 4,787,280 | 11/1988 | Voelkerding | 82/124 |
| 5,072,635 | 12/1991 | White | 82/124 |

FOREIGN PATENT DOCUMENTS

| | | | |
|---|---|---|---|
| 2380096 | 10/1978 | France | 82/124 |
| 112705 | 9/1980 | Japan | 82/124 |
| 9104 | 1/1981 | Japan | 82/124 |
| 226201 | 10/1986 | Japan | 82/124 |
| 1033944 | 6/1966 | United Kingdom | 82/125 |
| 2127717 | 4/1984 | United Kingdom | 82/124 |

OTHER PUBLICATIONS

Metalworking Production, Jun. 29, 1956, p. 969.

Primary Examiner—Z. R. Bilinsky
Attorney, Agent, or Firm—Shlesinger, Arkwright & Garvey

[57] ABSTRACT

A finished parts catcher for an automatic machine having a workholder and a part cut-off means comprising a finished part receptacle or chute positioned beneath the workholder; piston and cylinder means for imparted movement to the receptacle, the piston and cylinder means has first and second ends; the receptacle being positioned from the first end of the piston and cylinder means; at least one connecting rod extends between and is attached to the receptacle and the second end of the piston and cylinder means; means for limiting travel of the connecting rod and a control means to actuate the piston and cylinder means thereby simultaneously moving the connecting rod and causing the receptacle to move to a position beneath the workholder prior to release of the finished part so as to catch the finished part when released from the workholder. The caught finished part is directed to a parts basket from which it can be easily removed while the automatic machine is cycling.

51 Claims, 4 Drawing Sheets

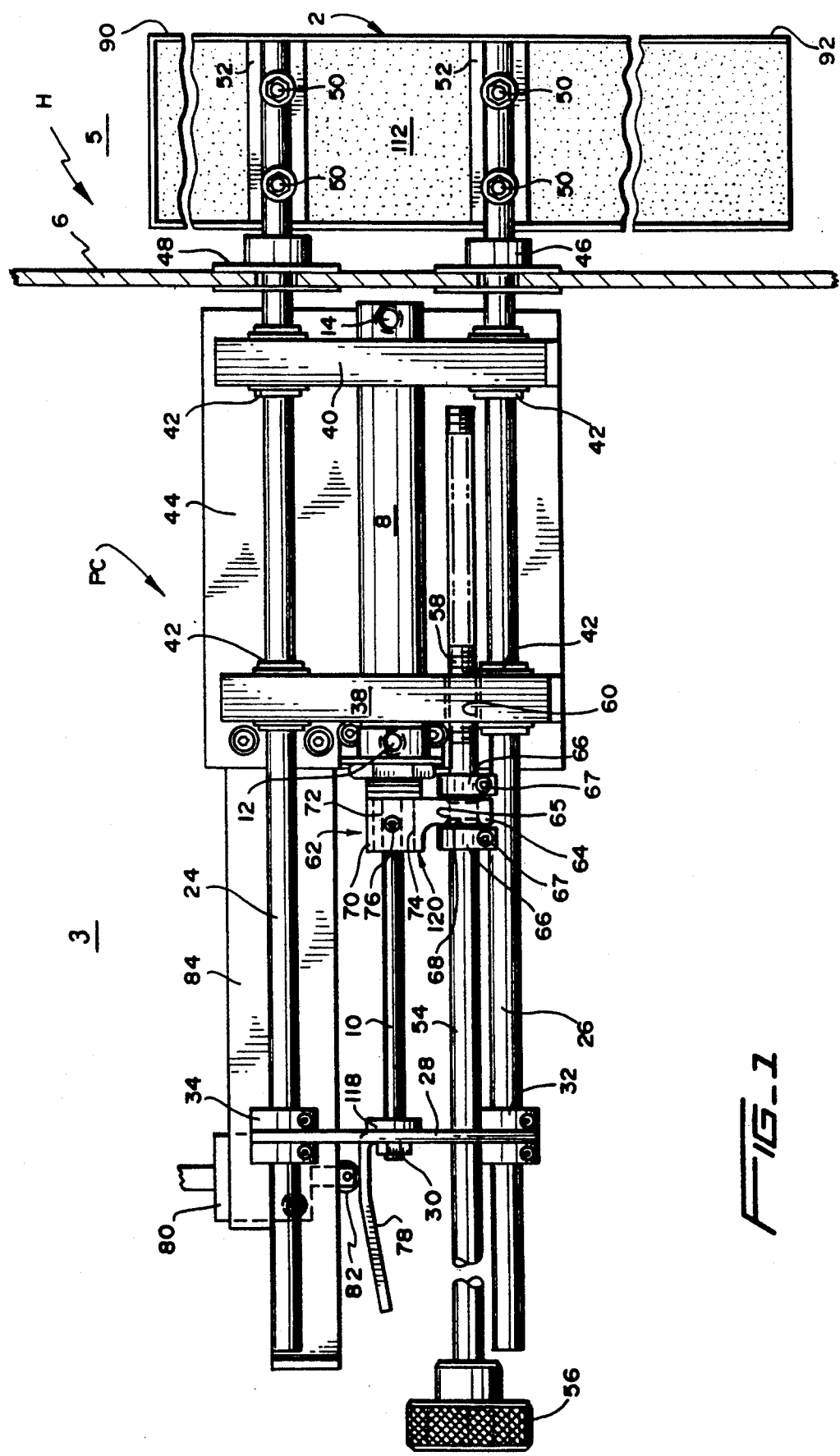

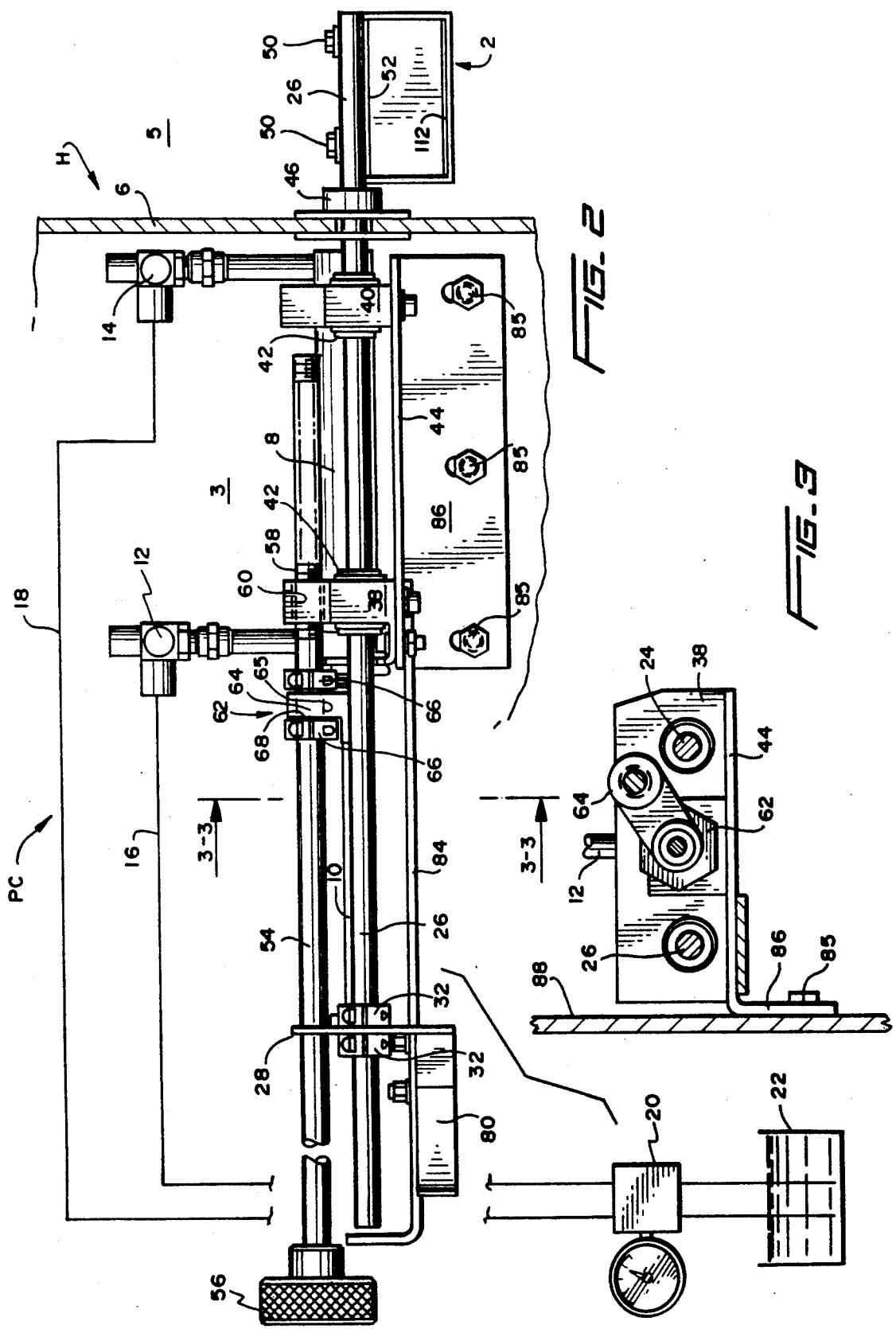

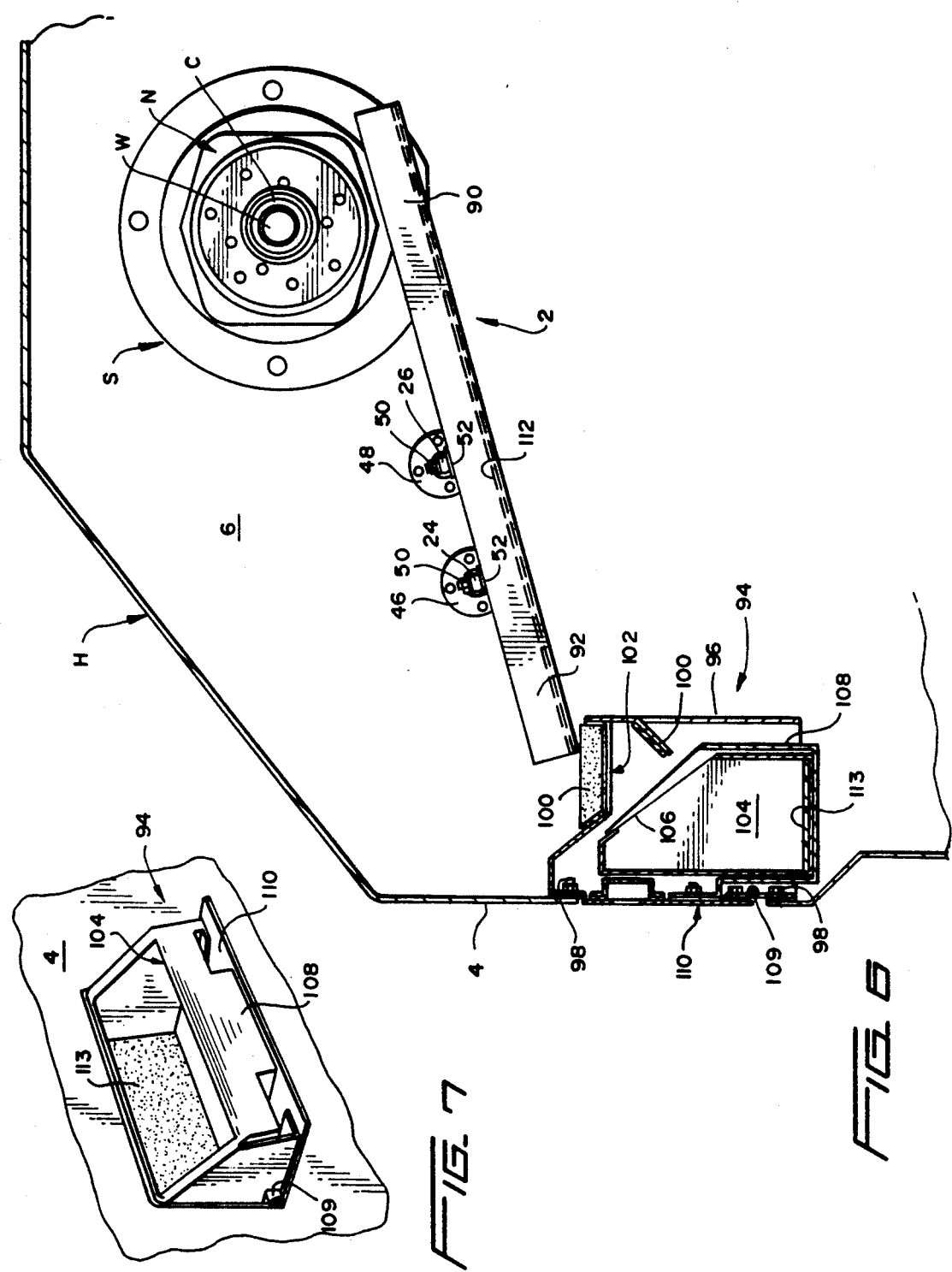

5,186,086

FINISHED PARTS CATCHER FOR AN AUTOMATIC MACHINE

FIELD OF THE INVENTION

This invention relates to a recovery device for parts which are machined on an automatic lathe or similar cutting machine.

BACKGROUND OF THE INVENTION

In the machine tooling art, particularly with respect to automatic lathes, once a workpiece has been cut or formed, it is automatically dropped into a receiving container. Various examples of such devices are shown in King U.S. Pat. No. 3,786,700, Scholtes U.S. Pat. No. 3,889,559, and Fortune U.S. Pat. No. 3,823,628.

The devices shown in these patents are typical of the stated art but do not incorporate mechanisms for preventing chips or the like from collecting in the receptacle during the machining operations. Further, the devices as shown are not positioned so as to be recessed and out of the way of the operator during machine operation thereby avoiding injury to the operator by coming in contact with projecting parts and the like.

In addition, the prior art devices very often result in damaging the machine part when it is dropped into the container. Impact of a machined part which strikes a receiving container or metal shavings therein render these parts useless for precision mechanics.

OBJECTS AND SUMMARY

It is an object of this invention to provide a parts catcher which is programmable and operable in conjunction with an automatic lathe.

Another object of this invention is provide a parts catcher which is fluid powered for smooth and reliable operation.

Yet a further object of this invention is to provide a parts catcher which automatically extends beneath a finished part prior to release of the part thereby reducing operator effort.

Still a further object of this invention is to provide a parts catcher which can be incrementally adjusted by the operator to accommodate varying size workpieces.

An additional object of this invention is to provide a parts catcher which remains retracted during cutting of the workpiece by the automatic machine thereby preventing metal chips from entering the parts catcher.

Still a further object of the present invention is to provide a parts catcher which contains a special liner to reduce the incidence of damage to a finished part when it impacts the parts catcher after release by the automatic machine.

Yet another object of the present invention is to provide a parts basket which operates to collect parts from the reciprocating receptacle without the accumulation of unwanted chips and coolant.

Still a further object of the present invention is to provide a parts catcher which directs cut-off parts into a door mounted storage basket. Access to a finished workpiece is made through a convenient door mounted on the exterior of the automatic machine thereby allowing retrieval of the part while the machine is cycling.

In summary, the present invention relates to a parts catcher for use in conjunction with an automatic lathe and which is provided with programmable operation, chute throw adjustment of the receptacle and convenient access to a collected, finished workpiece after cutting.

These and other objects and advantages of this invention will be apparent from the following detailed description taken in consideration with the accompanying drawing in which:

FIG. 1 is a top plan view of the parts catcher with a portion of the catcher shown extending through the automatic machine headwall, the parts receptacle is shown as being of indeterminate length;

FIG. 2 is a side view of the device mounted in the wall as shown in FIG. 1 including a schematic of the fluid lines operating the piston and cylinder;

FIG. 3 is a fragmentary cross sectional view taken along lines 3—3 of FIG. 2 and viewed in the direction of the arrows;

FIG. 6 is a fragmentary cross sectional view of the parts catcher showing the angular disposition of the receptacle and the position of the parts catcher basket as mounted to the machine housing;

FIG. 7 is a fragmentary perspective view of the parts catcher basket with the door in the open position.

FIGS. 1 THROUGH 4

Figure 5:
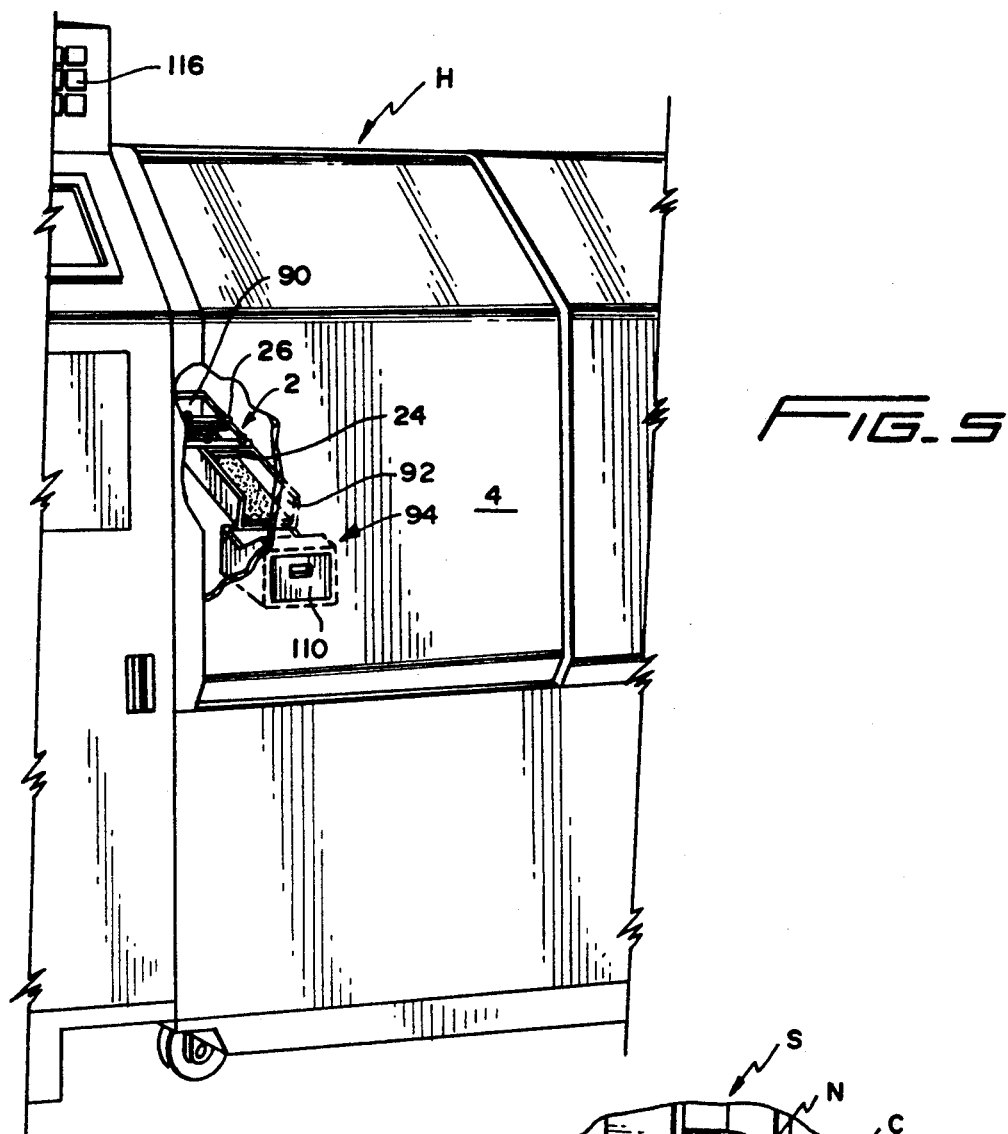
FIG. 5 is a fragmentary perspective view of an automatic machine with portions broken away to show the parts catcher and basket means.

The housing H of the automatic machine includes a spindle S with nose portion N supporting the workholder or chuck C which in turn grasps the bar stock or workpiece W to be cut. The housing H includes a head wall 6 which divides the housing H into a first section 3 and a second section 5. Positioned below the spindle S in the second section 5 is the reciprocating chute or receptacle 2 of the parts catcher PC.

The main body of the parts catcher PC includes a piston and cylinder assembly 8 positioned in first section 3 and including a piston rod 10. The piston rod 10 reciprocates between an extended position as shown in FIGS. 1 and 2 and a retracted position inside of the piston and cylinder assembly 8 (not shown).

The piston and cylinder assembly 8 includes fittings 12 and 14 connected to respective fluid lines 16 and 18 provided with associated flow control valve 20 and fluid reservoir 22. The present invention contemplates the use of either pneumatic or hydraulic fluid to operate the piston and cylinder assembly 8 however the invention is not limited to those means and other power sources are within the scope of the invention.

The parts catcher PC includes connecting rods 24 and 26 extending parallel to the piston and cylinder means 8 and interconnected in the first section 3 to the piston rod 10 by an end plate assembly 28. The end plate assembly 28 includes a nut and washer 30 or other means for attachment of connecting rods 24 and 26 to piston rod 10. Adjustable pairs of clamps 32 and 34 are provided for securing the end plate assembly 28 to each of the connecting rods 24 and 26. The connecting rods 24 and 26 extend through piston and cylinder mounts 38 and 40. The piston and cylinder mounts 38 and 40 are provided with appropriate bearing means 42 which facilitate movement of the connecting rods 24 and 26 through the mounts 38 and 40. The piston and cylinder mounts 38 and 40 are secured to mounting plate 44 which attaches the parts catcher PC to the first section 3 of housing H. The connecting rods 24 and 26 extend through the head wall 6 via associated seal assemblies 46 and 48. The receptacle 2 is attached to the connecting rods 24 and 26 in the second section 5 of housing H. Bolt assemblies 50 are shown extending through the ends of connecting rods 24 and 26 and through receptacle flanges 52 for connection therebetween. Any other type of connection means is contemplated within the scope of the present invention so long as the receptacle 2 is rigidly attached to the connecting rods 24 and 26.

A screw rod 54 provided with adjustment knob 56 is disposed parallel to and above connecting rods 24 and 26. The screw rod 54 includes threaded portions 58 about which the screw rod 54 is threadedly connected to matching female threads 60 in piston cylinder mount 38 and as indicated by phantom lines. Rotation of the screw rod 54 by adjustment knob 56 will either extend or retract the screw rod 54 relative to the stationary piston and cylinder mount 38.

The screw rod 54 has mounted thereon a stop means 62 which travels along piston rod 10 upon rotation of the screw rod 54. Stop means extension 64 of the stop means 62 includes a hollow passage 65 (shown in phantom lines) through which the screw rod 54 extends and freely rotates. A pair of clamp collars 66 including set screws are secured on either side of the stop means extension 64 to position it on the screw rod 54. A narrow space 68 exists between the facing surfaces of clamp collars 66 and stop means extension 64 so as to allow the screw rod 54 to freely rotate inside the hollow passage 65 of the stop means 62.

The stop means 62 is provided with a second passageway 72 extending through the main body portion 70 and is indicated by phantom lines. The piston rod 10 extends through second passageway 72. The main body portion 70 of the stop means 62 further includes a bearing race 74 indicated by phantom lines. The main body portion 70 of stop means 62 includes a set screw 76 for securing the bearing race 74 within the main body portion 70.

The end plate assembly 28 includes a cam surface 78 which operates in conjunction with a cam roller 82 of microswitch 80 or similar sensor device. The microswitch 80 is shown mounted to extension 84 of the mounting plate 44 and is further connected by appropriate circuitry to the computer (not shown). The mounting plate 44 includes elbow portion 86 for mounting to an interior surface 88 in first section 3 of the housing H. The mounting is accomplished by bolts 85 or other attachment means.

FIGS. 5 THROUGH 7

As best shown in FIGS. 5 and 6, the receptacle 2 is positioned within second section 5 of the housing H at an incline with an upper portion 90 disposed beneath the spindle S. The lower portion 92 of the receptacle 2 is positioned above a parts basket 94. The parts basket 94 includes a shroud 96 which is mounted to the interior of the housing front wall 4 by appropriate bolts 98 or other attachment means. The shroud 96 includes inwardly disposed deflector means 100 positioned above and below shroud opening 102. Positioned within the parts basket 94 is a leak-proof interior receptacle 104 having an opening 106 co-axial with shroud opening 102. The interior receptacle 104 rests within mounting 108 which is secured to the interior surface of a door 110. The door 110 is disposed within the front wall 4 of housing H and includes a hinge 109 or similar means.

As best shown in FIG. 7, the door 110 may be readily opened to provide access to the interior of parts basket 94. The interior receptacle 104 of the parts basket 94 is removable, should it require replacement due to wear or in the event of periodic cleaning.

The floor 112 of the receptacle 2 is provided with cushioned liner, preferably of a polyethylene material. The present invention is not restricted to the use of polyethylene but is intended to encompass a wide range of cushioning materials including but not limited to synthetic plastics, elastomers, natural rubbers, cork or the like. Similarly, the facing surface of the deflector means 100 and the floor 113 of the interior receptacle 104 are provided with a polyethylene liner.

Also mounted on the housing H are program controls 116 depicted in FIG. 5 as operating buttons and associated circuitry for electronically programming and controlling the operation of the parts catcher PC via a computer (not shown).

OPERATION

Figure 4:
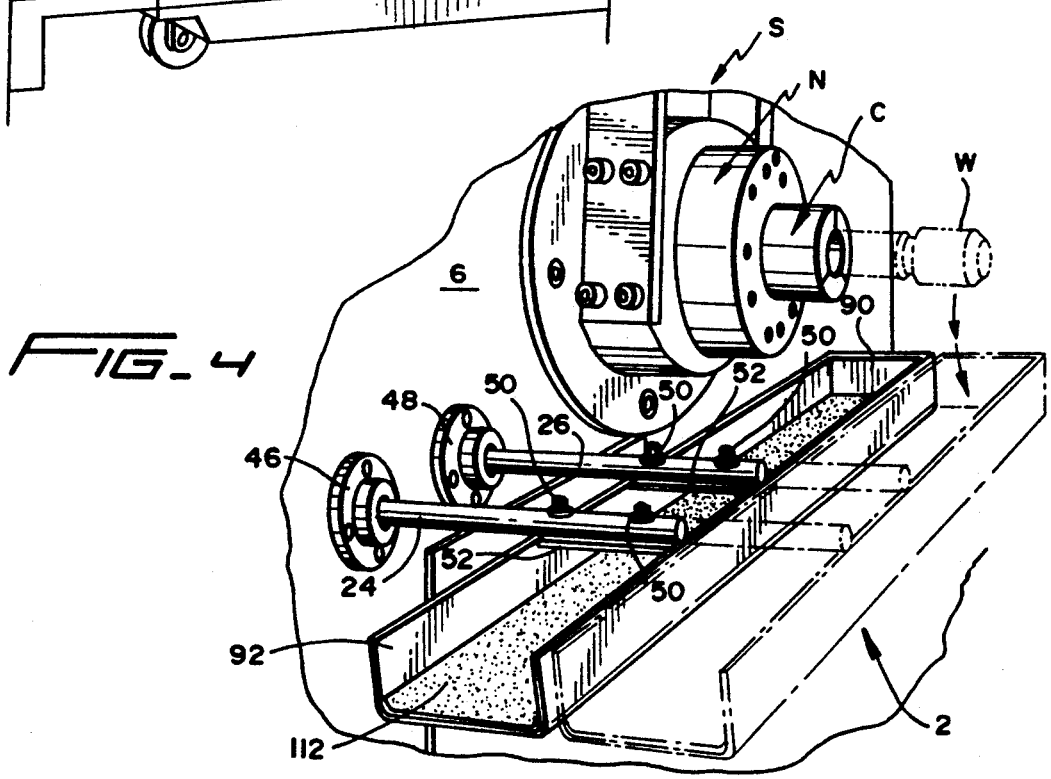
FIG. 4 is a fragmentary perspective view of the parts catcher receptacle positioned beneath the spindle and including portions shown in phantom lines in the extended position.

As best shown in FIG. 4, the operator will program the computer of the parts catcher PC so as to automatically extend the receptacle 2 from a retracted position to an extended position (shown in phantom lines) beneath a finished workpiece W held by the chuck C prior to its cut-off. The extension and retraction of the receptacle 2 at the appropriate time will not only allow a finished workpiece W to be automatically caught and directed to storage, but also reduce the unwanted collection of coolant and metal shavings which are produced during cutting of the workpiece W.

In operation, a program signal from the computer will activate the flow control valve 20 to direct fluid from reservoir 22 into the fluid line 16 and thereby impart movement to the piston and cylinder assembly 8. The piston rod 10 will begin a return stroke from its extended position as shown in FIGS. 1 and 2. When the piston rod 10 is retracted into the piston and cylinder assembly 8, the attached connecting rods 24 and 26 also begin to move through the piston and cylinder mounts 38 and 40 urging the receptacle 2 into an extended position beneath a workpiece W held by the chuck C. As the piston rod 10 nears full retraction within the piston and cylinder assembly 8, the cam surface 78 of end plate assembly 28 loses contact with cam roller 82 thereby activating microswitch 80 which sends a signal to the computer (not shown) indicating that the piston rod 10 is retracted and the receptacle 2 fully extended. Continued movement of piston rod 10 is halted by contact of end plate washer 118 with surface 120 of stop means 62. At this point, the receptacle 2 is fully extended beneath a workpiece W which after being cut, is then released by chuck C as shown by phantom lines in FIG. 4.

Because of the wide variety of workpiece lengths and sizes, the present invention is provided with an adjustment means for changing the distance of extension, i.e. the "chute throw" of the receptacle 2. The receptacle 2 is initially positioned an approximate distance beneath a prospective workpiece W to be caught by the parts catcher PC. The operator may then rotate adjustment knob 56 of the screw rod 54 thereby causing the stop means 62 to travel along the piston rod 10 and consequently shorten or lengthen the distance which connecting rods 24 and 26 may move. For example, if adjustment knob 56 is rotated counterclockwise, the stop means 62 shown in FIG. 1 and 2 will move towards the end plate assembly 28 and decrease the distance the end plate washer 118 must travel before abutting against stop means surface 120. This repositioning of the stop means 62 decreases the extent to which connecting rods 24 and 26 may move and consequently the distance receptacle 2 can extend. Conversely, rotation of the screw rod in the opposite direction will increase the distance between end plate washer 118 and stop means 120, thereby increasing the extension or "chute throw" of receptacle 2.

After a cut-off part W is released from chuck C, it falls into the extended receptacle 2 as depicted in phantom lines of FIG. 4. A finished part will then roll by gravity towards the open, lower portion 92 of the receptacle 2 and enter the parts basket 94. The opening 102 of the parts basket 94 has deflector means 100 which direct the part W to the interior receptacle 104. An operator may then retrieve the finished part W by opening the door 110 as shown in FIG. 7.

After a part W has been deposited within the parts basket 94, the programmed circuit will activate valve 20 to allow withdrawal of fluid from the piston and cylinder assembly 8 via fluid lines 18 thereby causing the piston rod 10 to return to the extended position. The connecting rods 24 and 26 again move in conjunction with the piston rod 10 and cause retraction of the receptacle 2 from beneath the chuck C. The control valve 20 continues to allow fluid to be withdrawn from line 18 until continued movement of piston rod 10 causes the cam surface 78 of end plate assembly 28 to once again contact cam roller 82, deactivating microswitch 80 and stopping movement of piston and cylinder assembly 8.

At this point, a new workpiece W is being cut while held by chuck C with the retracted receptacle 2 free of collecting metal shavings and coolant fluid during cutting.

It will be obvious that the parts basket 94 can receive a number of finished parts W and that these parts can be readily removed individually or at once while the cutting operation is in progress.

While this invention has been described as having a preferred design, it will be understood that it is capable of further modification. The application is, therefore, intended to cover any variations, uses, or adaptions of the invention following the general principles thereof and including such departures from the present disclosure as come within known or customary practices in the art to which the invention pertains, and as may be applied to the essential features hereinbefore set forth and fall within the scope of this invention or the limits of the claims.

We claim:

1. A finished part catcher for an automatic machine having a workholder and part cut-off means comprising:
   (a) a finished part receptacle positionable beneath said workholder;
   (b) piston and cylinder means for imparting movement to said receptacle, said piston and cylinder means having first and second ends;
   (c) said receptacle is spaced adjacent to one of said ends of said piston and cylinder means and free from any connection therewith;
   (d) at least one connecting rod having first and second ends, one of said ends of said connecting rod is directly attached to the other of said ends of said piston and cylinder means and movable therewith, the other of said ends of said connecting rods is directly attached to said receptacle;
   (e) means for limiting travel of said at least one connecting rod; and
   (f) control means to actuate said piston and cylinder means, thereby simultaneously moving said at least one connecting rod and causing said receptacle to move to a position beneath said workholder prior to release of the finished part so as to catch the finished part when released from said workholder.

2. A part catcher as in claim 1 and wherein:
   (a) said at least one connecting rod disposed parallel to said piston and cylinder means.

3. A parts catcher as in claim 1 and wherein: (a) said piston and cylinder means including a piston rod extensible through said second end of said piston and cylinder means and movable therewith.

4. A parts catcher as in claim 3 and wherein:
   (a) said at least one connecting rod attached to said second end of said piston and cylinder means by an end plate extending between the end of said piston rod and said at least one connecting rod.

5. A parts catcher as in claim 4 and wherein:
   (a) said at least one connecting rod including a plurality of connecting rods.

6. A parts catcher as in claim 5 and wherein:
   (a) said end plate extending between and attached to said plurality of connecting rods.

7. A parts catcher as in claim 4 and wherein:
   (a) at least one piston and cylinder mount for securely positioning said piston and cylinder means during operation.

8. A parts catcher as in claim 7 and wherein:
   (a) at least one of said at least one piston and cylinder mount extending transverse to said piston and cylinder means for providing support to said at least one connecting rod and to allow movement therethrough.

9. A parts catcher as in claim 8 and wherein:
   (a) a support bracket connected to said at least one of said at least one piston and cylinder mount for securing said parts catcher to said automatic machine.

10. A parts catcher as in claim 1 and wherein:
    (a) said means for limiting travel of said at least one connecting rod including a stop means.

11. A parts catcher as in claim 7 and wherein:
    (a) said means for limiting travel of said connecting rod including a stop means positioned on said piston rod, said piston rod movable therethrough so as to allow said end plate to abut said stop means thereby restricting further travel of said piston rod and said at least one of said connecting rod.

12. A parts catcher as in claim 11 and wherein:
    (a) adjustment means for repositioning said stop means on said piston rod.

13. A parts catcher as in claim 12 and wherein:
    (a) said adjustment means repositions said stop means relative to said end plate.

14. A parts catcher as in claim 13 and wherein:
    (a) said adjustment means comprising a screw rod movable along the length of said parts catcher.

15. A parts catcher as in claim 14 and wherein:
    (a) said screw rod situated parallel to and above said at least one connecting rod.

16. A parts catcher as in claim 14 and wherein:
    (a) said screw rod threadedly connected to said at least one of said at least one piston and cylinder mount and rotationally and axially movable through said end plate and said at least one of said at least one piston and cylinder mount.

17. A parts catcher as in claim 14 and wherein:
(a) said stop means is attached to said screw rod and movable therewith so as to provide incremental repositioning of said stop means relative to said end plate upon rotational movement of said screw rod.

18. A parts catcher as in claim 4 and wherein:
(a) said control means including a sensor for alerting said control means after predetermined travel of said piston rod.

19. A parts catcher as in claim 18 and wherein:
(a) said sensor is a microswitch.

20. A parts catcher as in claim 18 and wherein:
(a) said end plate including a cam surface which cooperates with said sensor to effect deactivation of said piston and cylinder means after predetermined travel of said piston rod.

21. A parts catcher as in claim 1 and wherein:
(a) said piston and cylinder means further including fluid pressure lines connected to a variable speed flow valve.

22. A parts catcher as in claim 18 and wherein:
(a) said control means further includes programmable means for moving said finished part receptacle in a selected sequence automatically.

23. A parts catcher as in claim 1 and wherein:
(a) said finished part receptacle disposed at an incline and having an upper end and a lower end; and,
(b) said upper end positionable beneath said workpiece.

24. An automatic machine tool comprising:
(a) a housing;
(b) said housing including a front wall and a head wall, said head wall dividing said housing into a first section and second section;
(c) spindle means mounted in said head wall and having a nose portion extending into said second section;
(d) a workholder mounted on said nose portion;
(e) a finished parts catcher in said first and second sections and extending through said head wall;
(f) said finished parts catcher including piston and cylinder means mounted in said first section, said piston and cylinder means having first and second ends;
(g) said finished parts catcher including at least one connecting rod extending through said head wall and having a first end positioned in said first section and a second end positioned in said second section;
(h) said finished parts catcher including a movable receptacle in said second section movably supported by said second end of said at least one connecting rod;
(i) said movable receptacle positioned in said second section to receive finished parts from said workholder;
(j) said finished parts catcher including means for limiting travel of said movable receptacle;
(k) means for connecting said piston and cylinder means to said at least one connecting rod;
(l) basket means to receive a finished part from said movable receptacle, said basket means including inwardly disposed deflector means for directing a finished part into the interior of said basket means; and,
(m) control means associated with said housing for activating said piston and cylinder means thereby to simultaneously move said at least one connecting rod and said receptacle to move said receptacle to a position beneath said workholder to receive a finished part when released from said workholder.

25. An automatic machine tool as in claim 24 and wherein:
(a) said movable receptacle comprising a chute having an open end; and,
(b) said receptacle horizontally disposed at an incline with said basket means positioned beneath said receptacle open end.

26. An automatic machine tool as in claim 24 and wherein:
(a) said movable receptacle and said deflector means provided with cushioning material to protect a finished part coming into contact therewith.

27. An automatic machine tool as in claim 26 and wherein:
(a) said cushioning material is polyethylene.

28. An automatic machine tool as in claim 24 and wherein:
(a) said piston and cylinder means including a piston rod extensible through said second end of said piston and cylinder means and moveable therewith.

29. An automatic machine tool as in claim 28 and wherein:
(a) said at least one connecting rod attached to said second end of said piston and cylinder means by an end plate extending between the end of said piston rod and said at least one connecting rod.

30. An automatic machine tool as in claim 29 and wherein:
(a) at least one piston and cylinder mount for securely positioning said piston and cylinder means during operation.

31. An automatic machine tool as in claim 30 and wherein:
(a) at least one of said at least one piston and cylinder mount extending transverse to said piston and cylinder means for providing support to said at least one connecting rod and to allow movement therethrough.

32. An automatic machine tool as in claim 31 and wherein:
(a) support bracket connected to said at least one of said at least one piston and cylinder mount for securing said parts catcher to said enclosed portion of said housing.

33. An automatic machine as in claim 29 and wherein:
(a) said means for limiting travel of said at least one connecting rod including a stop means positioned on said piston rod, said piston rod movable therethrough so as to allow said end plate to abut said stop means thereby restricting further travel of said piston rod and said at least one of said connecting rods.

34. An automatic machine as in claim 33 and wherein:
(a) adjustment means for repositioning said stop means on said piston rod and relative to said end plate; and,
(b) said adjustment means comprising a screw rod situated parallel to and above said at least one connecting rod and movable along the length of said parts catcher.

35. An automatic machine as in claim 34 and wherein:
(a) said screw rod threadedly connected to said at least one of said at least one piston and cylinder mount and rotationally and axially movable through said end plate and said at least one of said at least one piston and cylinder mount.

36. An automatic machine as in claim 35 and wherein:
(a) said stop means is attached to said screw rod and movable therewith so as to provide incremental repositioning of said stop means relative to said end plate by rotational movement of said screw rod.

37. An automatic machine as in claim 29 and wherein:
(a) said control means including an automatic sensor for alerting said control means after predetermined travel of said piston rod.

38. An automatic machine as in claim 37 and wherein:
(a) said sensor is a microswitch.

39. An automatic machine as in claim 37 and wherein:
(a) said end plate including a cam surface which cooperates with said sensor to effect deactivation of said piston and cylinder means after predetermined travel of said piston rod.

40. An automatic machine as in claim 24 and wherein:
(a) said piston and cylinder means further including fluid pressure lines connected to a variable speed flow valve.

41. An automatic machine as in claim 37 and wherein:
(a) said control means further includes programmable means for moving said finished part receptacle in a selected sequence automatically.

42. A finished part catcher for an automatic machine having a workholder and part cut-off means comprising:
(a) a finished part receptacle positionable beneath said workholder;
(b) piston and cylinder means for imparting movement to said receptacle, said piston and cylinder means having first and second ends;
(c) said receptacle positioned from said first end of said piston and cylinder means;
(d) at least one connecting rod extending between and attached to said receptacle and said second end of said piston and cylinder means;
(e) means for limiting travel of said at least one connecting rod;
(f) control means to actuate said piston and cylinder means, thereby simultaneously moving said at least one connecting rod and causing said receptacle to move to a position beneath said workholder prior to release of the finished part so as to catch the finished part when released from said workholder;
(g) said piston and cylinder means including a piston rod extensible through said second end of said piston and cylinder means and movable therewith;
(h) said at least one connecting rod attached to said second end of said piston and cylinder means by an end plate extending between the end of said piston rod and said at least one connecting rod; and,
(i) said at least one connecting rod including a plurality of connecting rods.

43. A parts catcher as in claim 42 and wherein:
(a) said end plate extending between and attached to said plurality of connecting rods.

44. A finished part catcher for an automatic machine having a workholder and part cut-off means comprising:
(a) a finished part receptacle positionable beneath workholder;
(b) piston and cylinder means for imparting movement to said receptacle, said piston and cylinder means having first and second ends;
(c) said receptacle positioned from said first end of said piston and cylinder means;
(d) at least one connecting rod extending between and attached to said receptacle and said second end of said piston and cylinder means;
(e) means for limiting travel of said at least one connecting rod;
(f) control means to actuate said piston and cylinder means, thereby simultaneously moving said at least one connecting rod and causing said receptacle to move to a position beneath said workholder prior to release of the finished part so as to catch the finished part when released from said workholder;
(g) said piston and cylinder means including a piston rod extensible through said second end of said piston and cylinder means and movable therewith;
(h) said at least one connecting rod attached to said second end of said piston and cylinder means by an end plate extending between the end of said piston rod and said at least one connecting rod;
(i) at least one piston and cylinder mount for securely positioning said piston and cylinder means during operation;
(j) said means for limiting travel of said connecting rod including a stop means positioned on said piston rod, said piston rod movable therethrough so as to allow said end plate to abut said stop means thereby restricting further travel of said piston rod and said at least one of said connecting rod; and,
(k) adjustment means for repositioning said stop means on said piston rod.

45. A parts catcher as in claim 44 and wherein:
(a) said adjustment means repositions said stop means relative to said end plate.

46. A parts catcher as in claim 45 and wherein:
(a) said adjustment means comprising a screw rod movable along the length of said parts catcher.

47. A parts catcher as in claim 46 and wherein:
(a) said screw rod situated parallel to and above said at least one connecting rod.

48. A parts catcher as in claim 46 and wherein:
(a) said screw rod threadedly connected to said at least one of said at least one piston and cylinder mount and rotationally and axially movable through said end plate and said at least one of said at least one piston and cylinder mount.

49. A parts catcher as in claim 46 and wherein:
(a) said stop means is attached to said screw rod and movable therewith so as to provide incremental repositioning of said stop means relative to said end plate upon rotational movement of said screw rod.

50. A finished part catcher for an automatic machine having a workholder and part cut-off means comprising:
(a) a finished part receptacle positionable beneath said workholder;
(b) piston and cylinder means for imparting movement to said receptacle, said piston and cylinder means having first and second ends;
(c) said receptacle positioned from said first end of said piston and cylinder means;
(d) at least one connecting rod extending between and attached to said receptacle and said second end of said piston and cylinder means;
(e) means for limiting travel of said at least one connecting rod;
(f) control means to actuate said piston and cylinder means, thereby simultaneously moving said at least one connecting rod and causing said receptacle to move to a position beneath said workholder prior to release of the finished part so as to catch the finished part when released from said workholder;

(g) said piston and cylinder means including a piston rod extensible through said second end of said piston and cylinder means and movable therewith;

(h) said at least one connecting rod attached to said second end of said piston and cylinder means by an end plate extending between the end of said piston rod and said at least one connecting rod;

(i) said control means including a sensor for alerting said control means after predetermined travel of said piston rod; and (j) said end plate including a cam surface which cooperates with said sensor to effect deactivation of said piston and cylinder means after predetermined travel of said piston rod.

51. A finished part catcher for an automatic machine having a workholder and part cut-off means comprising:

(a) a finished part receptacle positionable beneath said workholder;

(b) piston and cylinder means for imparting movement to said receptacle, said piston and cylinder means having first and second ends;

(c) said receptacle positioned from said first end of said piston and cylinder means;

(d) at least one connecting rod extending between and attached to said receptacle and said second end of said piston and cylinder means;

(e) means for limiting travel of said at least one connecting rod;

(f) control means to actuate said piston and cylinder means, thereby simultaneously moving said at least one connecting rod and causing said receptacle to move to a position beneath said workholder prior to release of the finished part so as to catch the finished part when released from said workholder;

(g) said piston and cylinder means including a piston rod extensible through said second end of said piston and cylinder means and movable therewith;

(h) said at least one connecting rod attached to said second end of said piston and cylinder means by an end plate extending between the end of said piston rod and said at least one connecting rod;

(i) said control means including a sensor for alerting said control means after predetermined travel of said piston rod; and, (j) said control means further includes programmable means for moving said finished part receptacle in a selected sequence automatically.

* * * * *